United States Patent [19]

Bounsall et al.

[11] Patent Number: 6,073,189
[45] Date of Patent: Jun. 6, 2000

[54] SYSTEM AND METHOD FOR INCREMENTAL PACKET RECORDING OF RECORDABLE COMPACT DISCS

[75] Inventors: Andrew Bounsall, Nepean; Richard E. Hone, Prescott, both of Canada

[73] Assignee: Adaptec, Inc., Milpitas, Calif.

[21] Appl. No.: 08/505,586

[22] Filed: Jul. 24, 1995

[51] Int. Cl.[7] .................................................. G06F 3/06
[52] U.S. Cl. ........................ 710/52; 710/30; 711/117; 369/58
[58] Field of Search ............................ 711/112, 113, 711/114, 115, 117, 118, 155, 170, 171, 172, 173; 707/101; 710/30, 52, 57; 369/58

[56] References Cited

U.S. PATENT DOCUMENTS 5,375,233  12/1994  Kimber et al. .......................... 707/205
5,434,838  7/1995   Haneda .................................... 365/58
5,446,857  8/1995   Russ ....................................... 711/100

OTHER PUBLICATIONS

Incat Systems Software USA, Inc., FlexCD File System, Mar. 1995, pp. 1–17 & Table 1–6.

*Primary Examiner*—Hiep T Nguyen
*Attorney, Agent, or Firm*—Martine Penilla & Kim, LLP

[57] ABSTRACT

A system and method for using the optional staging of files to a hard disk and a method for packetizing data to efficiently utilize the available storage capacity of a CD-R disc, and allows writes to and reads from an open CD-R disc while reserving a track to be written with a compatibility hierarchy for a conventional CD-ROM file system when the CD-R disc is closed.

19 Claims, 12 Drawing Sheets

Packet 1

800

Packet 2

(A)

Packet 3

(B)

↖ 1000

Packet 4
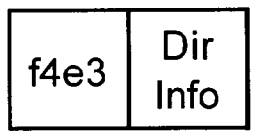
FIG. 11
Packet 4
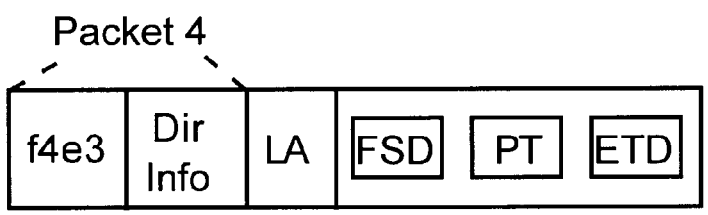
FIG. 12

SYSTEM AND METHOD FOR INCREMENTAL PACKET RECORDING OF RECORDABLE COMPACT DISCS

BACKGROUND OF THE INVENTION

1. Field of the Invention

The present invention relates generally to a computer system including a data storage system. More particularly, the invention relates to a system and method for the incremental packet recording of recordable compact discs.

2. Description of the Background Art

A Compact Disc-Read Only Memory (CD-ROM) disc offers massive storage capacity, currently over 600 megabytes (Mb) of data, and can store digital information for retrieval using a random access technique. As its name implies, a CD-ROM disc is not usable as a writable medium, i.e., the data on a CD-ROM disc cannot be changed once the disc is formed during the manufacturing process.

Unlike a CD-ROM disc, a Compact Disc-Recordable (CD-R) disc is usable as a writable medium. A limitation of CD-R, however, is that the medium can be written to only once. Hence, CD-R is also known as Compact Disc-Write Once (CD-WO). Once a portion of a CD-R disc is written, that portion cannot be erased or rewritten.

As a result of this limitation and other considerations, it has been common in the past for systems to write to an entire CD-R disc in one uninterrupted stream. Nevertheless, incrementally updating of a CD-R disc can be done using incremental recording techniques.

Currently, incremental recording techniques include recording a track at once (TAO), and packet recording (PR). PR can be accomplished by Fixed Packet Recording (FPR) or by Variable Packet Recording (VPR). In FPR the size of the packets are uniform, while in VPR the size of the packets may vary.

TAO is an incremental recording technique which requires that a track be written in one uninterrupted stream. TAO involves incremental writes that result in multiple tracks, inter-track overhead, and multiple sessions. Since compact discs have a limited number of tracks (typically 99 tracks), TAO is not a suitable method for incremental updates if the user treats the medium as rewritable and performs frequent and numerous updates.

In contrast with TAO, PR can record a track incrementally using packets. A packet includes one or more sectors of a track and is written in an atomic (uninterrupted) write transaction. Typically, a track is filled with packets in a sequential manner. PR can accommodate numerous updates because the number of writes is not limited to the number of tracks. Thus, maintaining a constant stream of data to the recorder is not as critical in PR as it is in TAO.

The ability to recover from error conditions is an additional feature of PR. Each packet is sent in a separate action. If the recorder determines that an error occurred in the transfer or write, the sending of the next packet can be delayed so that the packet can be re-sent.

A CD-R disc may be open (unfixated) or closed (fixated). An open CD-R disc is a CD-R disc with an open session. A closed CD-R disc is a CD-R disc without an open session. Data can be added to an open session, but not to a closed session. However, additional sessions can be added to a closed CD-R disc.

Formats for encoding compact discs include the ISO 9660 standard for encoding CD-ROM discs and the proposed ECMA 168 standard for encoding CD-R discs The specification of the ISO 9660 standard is available from the American National Standards Institute, 1430 Broadway, New York, N.Y. 10018, and is herein incorporated by reference in its entirety. The specification of the ECMA 168 standard is available from the European Computer Manufacturers Association, 114 Rue du Rhone—CH-1204 Geneva, Switzerland and is incorporated herein in its entirety.

Prior systems and methods for incremental recording a CD-R disc do not efficiently use the available storage capacity. In particular, prior systems and methods do not optimize the sizes of the packets to reduce the overhead of implementing a file system compliant with ECMA 168.

In addition, prior systems and methods for incremental recording a CD-R disc do not create a file system which is readable by a conventional CD-ROM drive when the CD-R disc is closed. In particular, prior systems and methods do not result in a closed CD-R disc which is readable by both a CD-R drive compliant with ECMA 168 and a CD-ROM drive compliant with ISO 9660 level 3.

It is desirable to provide a system and method for incremental recording of a CD-R disc which efficiently uses the available storage capacity, and creates a file system which is readable by a conventional CD-ROM drive when the CD-R disc is either open or closed.

SUMMARY OF THE INVENTION

The system and method of the present invention uses the optional staging of files to a hard disk and a method for packetizing data to efficiently utilize the available storage capacity of a CD-R disc, and allows writes to and reads from an open CD-R disc while reserving a track to be written with a compatibility hierarchy for a conventional CD-ROM file system when the CD-R disc is closed.

BRIEF DESCRIPTION OF THE DRAWINGS

FIG. 11 is a pictorial diagram illustrating a fourth packet which is built in an example of the operation of a preferred embodiment of the present invention.

FIG. 12 is a pictorial diagram illustrating the components of a third transaction which occurs in an example of the operation of a preferred embodiment of the present invention.

DETAILED DESCRIPTION OF THE PREFERRED EMBODIMENT

A preferred embodiment of the present invention is now described with reference to the figures where like reference numbers indicate identical or functionally similar elements. Also in the figures, the most significant digit(s) of each reference number corresponds to the figure in which the reference number is first used.

Figure 1:
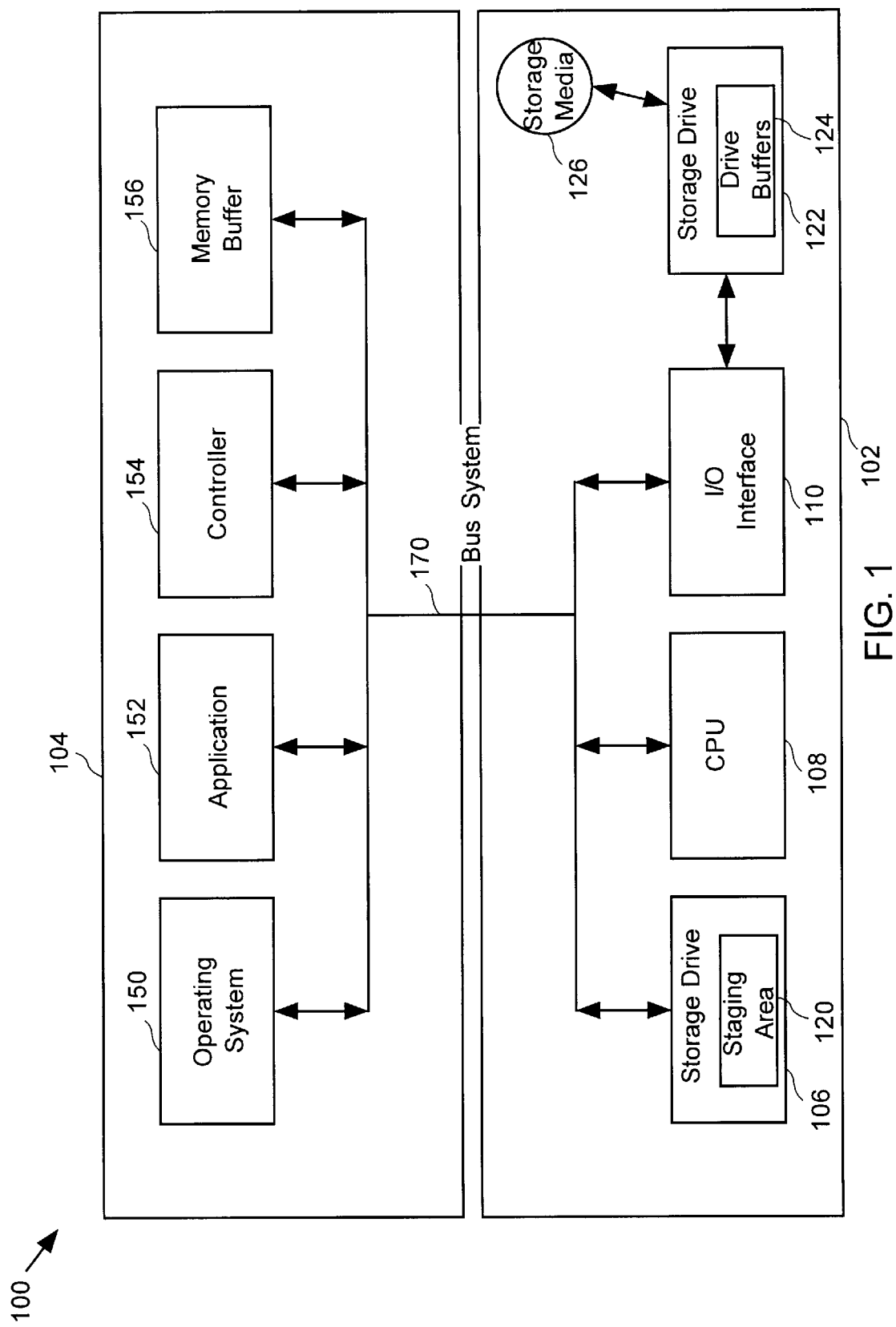
FIG. 1 is a block diagram illustrating a computer environment including a preferred embodiment of the present invention.

FIG. 1 illustrates a computer environment including a preferred embodiment of the present invention. The computer platform 100 includes hardware devices 102 and programs in a memory module 104 for operating the illustrated system. Communication between the programs of the memory module 104 and the hardware devices 102 occurs through bus system 170.

Preferably, the hardware devices 102 including a central processing unit (processor) 108, e.g., an Intel x86 or a Motorola PowerPC processor, communicating with: a storage device 106, e.g., a hard disk drive, and an input/output (I/O) interface 110, e.g., a small computer system interface (SCSI). Storage device 106 includes a staging area 120. Communicating with the I/O interface 110 is a storage drive 122, e.g., a compact disc-recordable (CD-R) drive such as the Sony CDU-920s, manufactured by Sony in San Jose, California, which can write to and read from a storage medium 126, e.g., a conventional CD-R disc manufactured by TDK in Nevada City, Calif. The storage drive 122 includes a drive buffer 124 which can temporarily store a packet before the packet is written to a storage medium 126.

Preferably, the programs of the memory module 104 include: an operating system (OS) 150, e.g., Windows 3.1, Windows 95, Windows NT available from Microsoft Corporation, Redmond, Wash.; or OS/2 available from IBM Corporation, Armonk, N.Y.; or Macintosh OS, available from Apple Computer, Cupertino, Calif., communicating with: (1) an application 152, e.g., Corel Draw, available from Corel Corporation, Ottawa, Ontario, Canada, which can create data to be stored as a file in a storage medium 126; (2) a controller 154 whose functions are further described herein with reference to FIGS. 2–14; and (3) a memory buffer 156 in which packets of data can be built.

Figure 2:
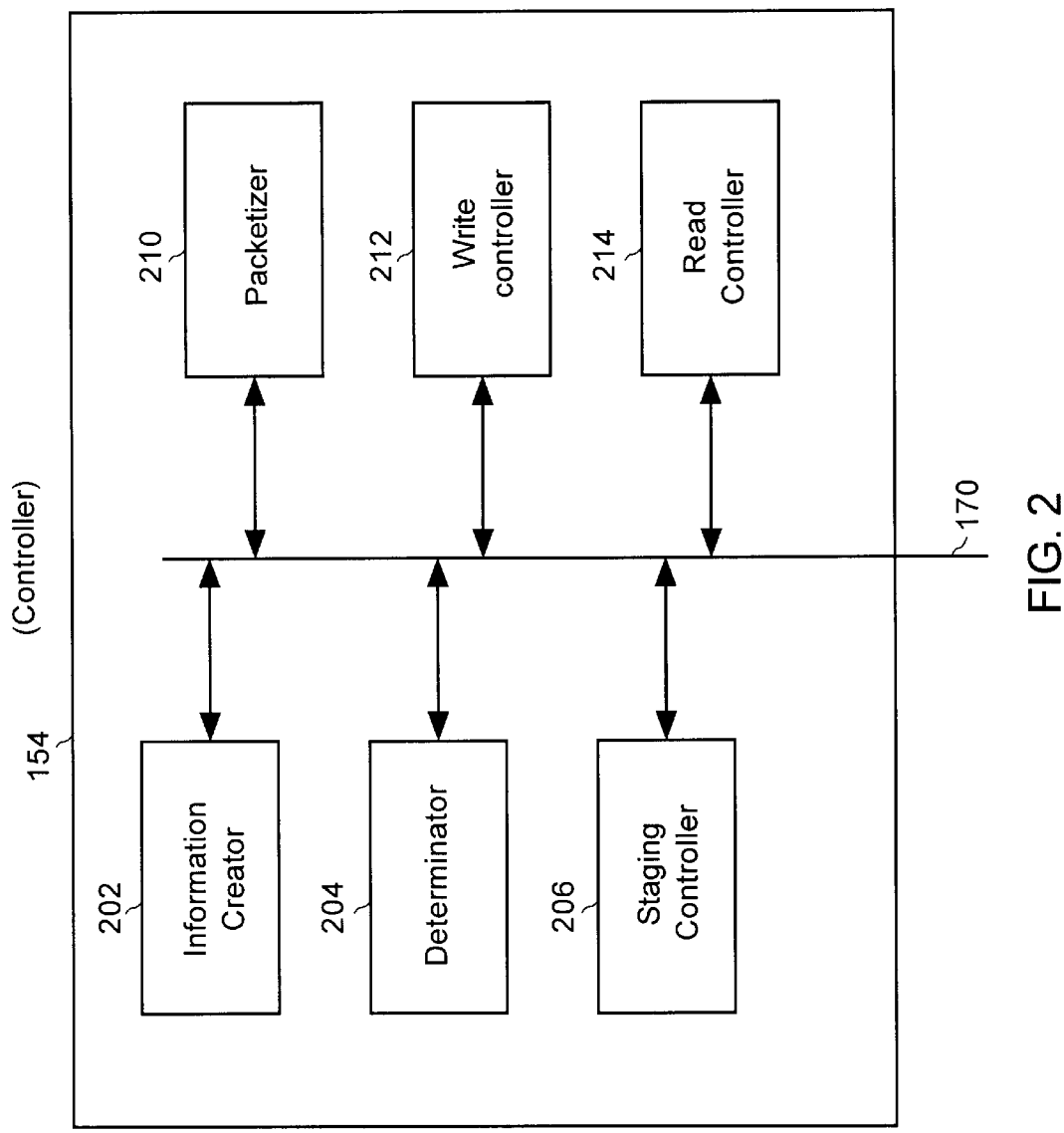
FIG. 2 is a block diagram illustrating a controller within a memory module of a preferred embodiment of the present invention.

FIG. 2 illustrates the controller 154 of a preferred embodiment of the present invention. The controller 154 controls the operations necessary to write data to and read data from the storage medium 126. The controller 154 has several modules including an information creator 202, a determinator 204, a staging controller 260, a packetizer 210, a write controller 212, and a read controller 214. These modules are described in greater detail below.

When the controller 154 receives a request from the application 152 via bus system 170 to write data to a file in the storage medium 126, an information creator 202 creates file-related information, including the size of the file. A file comprises the data and the file-related information.

A determinator 204 determines if the file is to be transferred via bus system 170 directly to the memory buffer 156, or if the file is to be sent to the staging area 120. If a file is sent to the staging area 120, the file remains there until it is flushed from the staging area 120. The functions performed by the determinator 204 are described in greater detail below with reference to FIGS. 3–14.

A staging controller 206 controls the flushing of the staging area 120. A file can be flushed from the staging area 120 either in one piece or in multiple pieces. Each piece of a file is called a file extent, or simply an extent. Files/extents flushed from the staging area 120 are transferred to the memory buffer 156 via bus system 170. The functions performed by the staging controller 206 are described in greater detail below with reference to FIGS. 3–14.

A packetizer 210 builds one or more packets from the files/extents in the memory buffer 156 and sends the one or more packets to the drive buffer 124 via bus system 170. The functions performed by the packetizer 210 are described in greater detail below with reference to FIGS. 3–14.

A write controller 212 controls the storage drive 122 during a write operation from the drive buffer 124 to the storage medium 126. The functions performed by the write controller 212 are described in greater detail below with reference to FIGS. 3–14.

A read controller 214 controls the storage drive 122 during a read operation from the storage medium 126. The functions performed by the read controller 214 are described in greater detail in the ECMA 168 standard.

Figure 3:
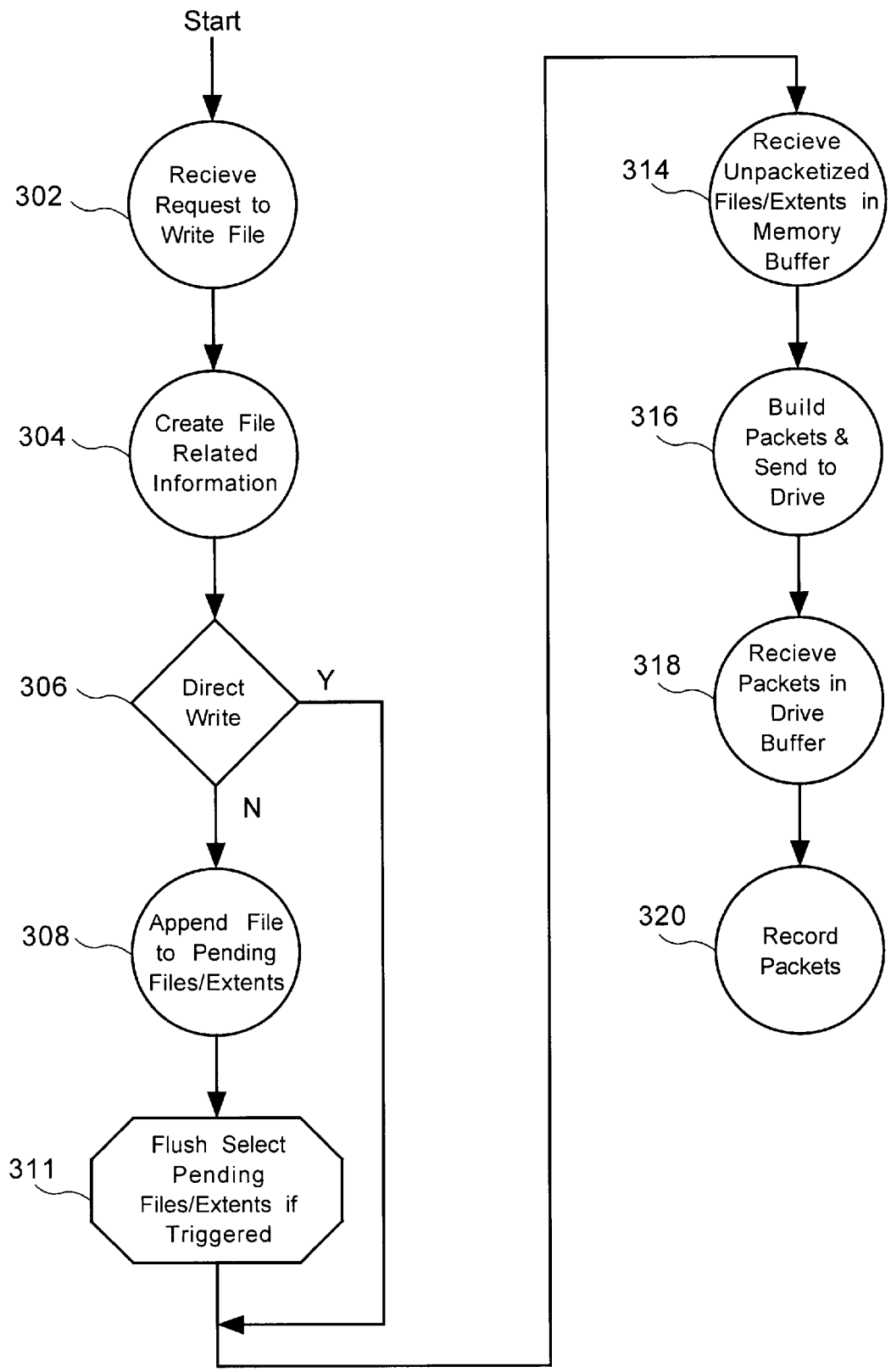
FIG. 3 is a flow diagram illustrating the method for writing data onto a storage medium according to a preferred embodiment of the present invention.

FIG. 3 is a flow diagram illustrating the method for writing files/extents to the storage medium 126 according to a preferred embodiment of the present invention. Initially, the controller 154 receives 302 a request from the application 152 to write the data to the file in the storage medium 126, and the information creator 202 creates 304 the file-related information. Subsequently, the determinator 204 determines 306 whether to transfer the file directly to the memory buffer 156 or to the staging area 120. A preferred method by which the determinator 204 determines where to transfer the file is described below with reference to FIG. 4A.

If the file is transferred to the staging area 120, the file is appended 308 to pending files/extents in the staging area 120. The staging controller 206 determines 311 how and when to flush the pending files/extents from the staging area 120. Flushed files/extents are transferred to the memory buffer 156. The method by which the staging controller 206 determines how and when to flush the pending files/extents from the staging area 120 is described below with reference to FIG. 4B.

After the memory buffer 156 receives 314 either the file directly or the flushed files/extents from the staging area 120, the packetizer 210 builds 316 one or more packets and sends 316 the one or more packets to the drive buffer 124. The method by which the packetizer 210 builds and sends the one or more packets is described below with reference to FIGS. 5–12.

The drive buffer 124 receives 318 the one or more packets. Subsequently, the write controller 212 controls 320 the storage drive 122 to write 320 the one or more packets from the drive buffer 124 to the storage medium 126 according to a file system. The file system is described below with reference to FIGS. 13 and 14.

Figure 4A:
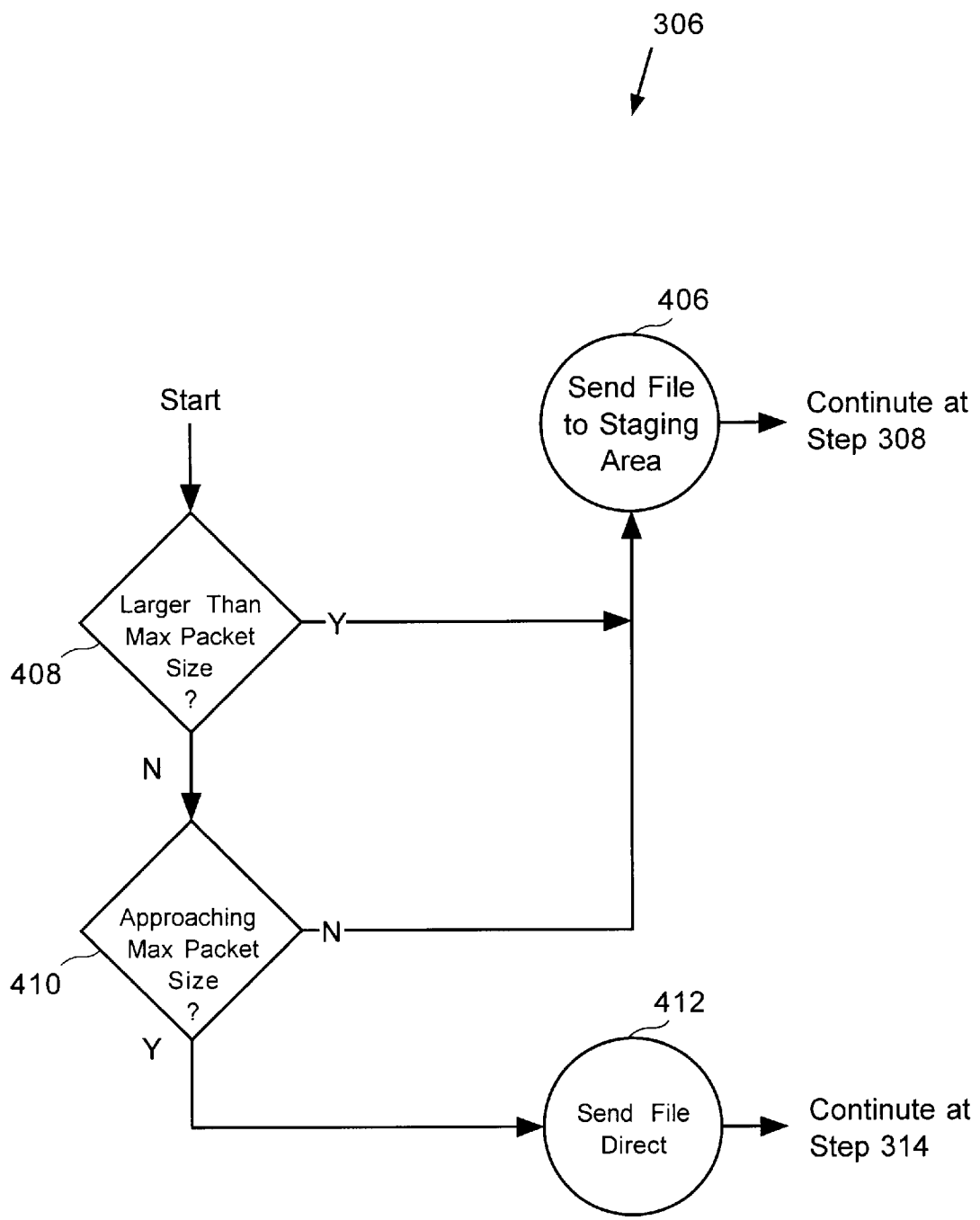
FIG. 4A is a flow diagram illustrating the method for determining whether to transfer a file directly to a memory buffer or to a staging area according to a preferred embodiment of the present invention.

FIG. 4A is a flow diagram illustrating the method by which the determinator 204 determines 306 whether to transfer a file directly to the memory buffer 156 or to the staging area 120.

The determinator 204 determines 408 whether the size of the file exceeds a maximum packet size. The maximum packet size is predefined and related to system, drive buffer, and memory constraints. For example, the maximum packet size may be predefined to be equal to the size of the drive buffer. In the preferred embodiment, the maximum packet size is related to the size of the drive buffer 124. However, in alternate embodiments the maximum packet size is related to the size of a virtual drive buffer. The size of the virtual drive buffer is related to the size of the available memory in the computer environment.

If the size of the file exceeds the maximum packet size, the file is sent 406 to the staging area 120. If the size of the file does not exceed the maximum packet size, the determinator 204 determines 410 if the size of the file approaches the maximum packet size.

If the size of the file approaches the maximum packet size, the file is sent 412 directly to the memory buffer 156. If the size of the file does not approach the maximum packet size, the file is sent 406 to the staging area 120. The percentage of the maximum packet size that will result in the file "approaching" the maximum packet size is predefined and is determined by system, drive buffer, and memory constraints.

Figure 4B:
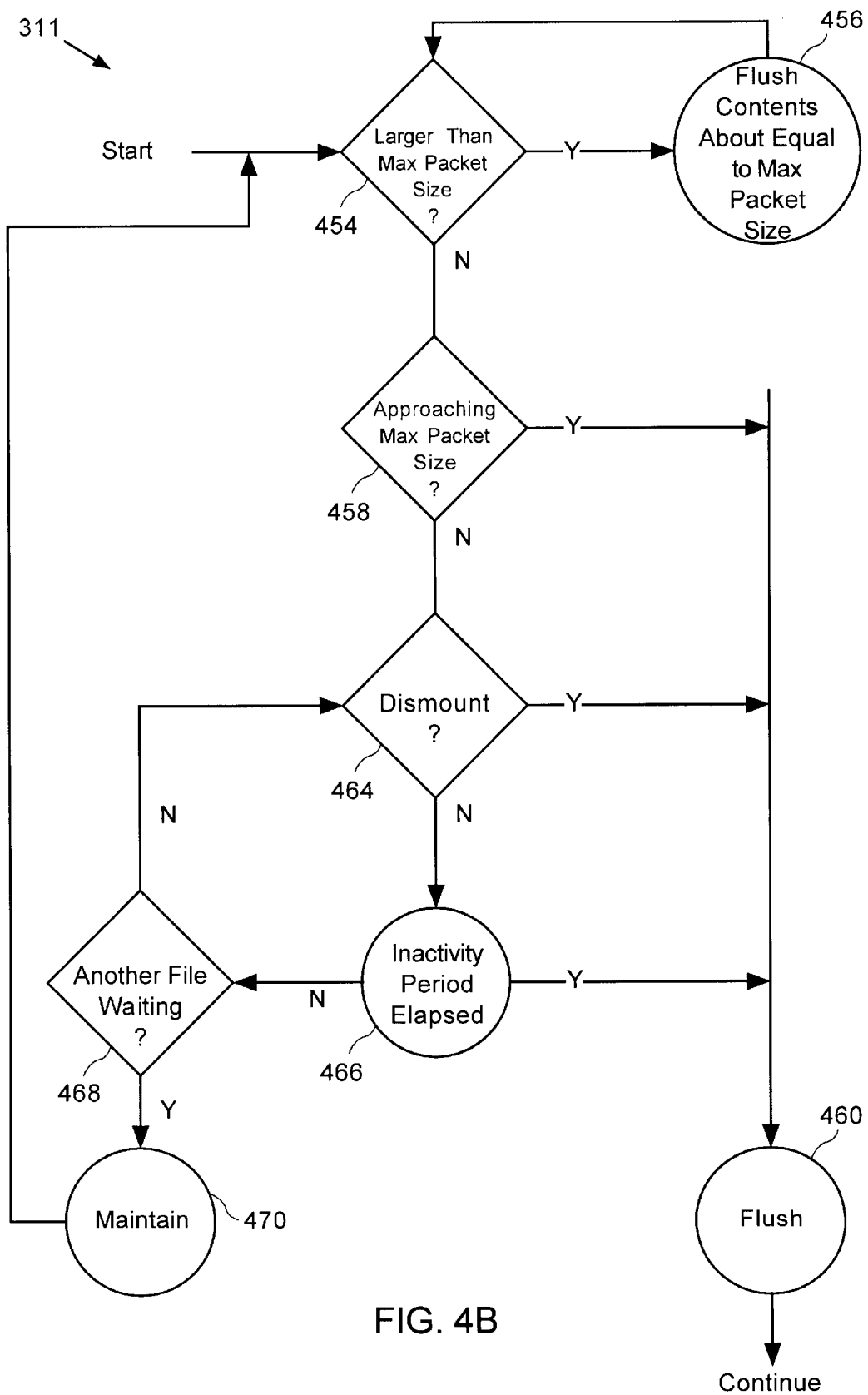
FIG. 4B is a flow diagram illustrating the method for determining when to flush a staging area according to a preferred embodiment of the present invention.

FIG. 4B is a flow diagram illustrating the method by which the staging controller 206 determines 312 how and when to flush 310 the staging area 120 according to a preferred embodiment of the present invention. If the file is sent 406 to the staging area 120, the file is appended 308 to pending files/extents therein. Subsequently, the staging controller 206 determines 454 if the total size of the pending files/extents (now including the file) exceeds the maximum packet size.

If the total size exceeds the maximum packet size, the staging controller 206 flushes 456 files/extents whose size is equal to the maximum packet size. Subsequently, the staging controller 206 repeats step 454 for the remaining files/extents. If the staging controller 206 determines 454 that the total size does not exceed the maximum packet size, the staging controller 206 determines 458 if the total size approaches the maximum packet size.

If the total size approaches the maximum packet size, the staging controller 206 flushes 460 the remaining contents of the staging area 120 to the memory buffer 156. If the total size does not approach the maximum packet size, the staging controller 206 determines 464 if a dismount of the storage medium 126 has been requested. An example of a request of a dismount of the storage medium 126 is when a user presses an eject button on the storage drive 122.

If the dismount has been requested, all of the pending files/extents are flushed 460 and sent to the memory buffer 156. If a dismount has not been requested, the staging controller 206 determines 466 if a predefined inactivity time period, e.g., a certain number of clock cycles, has elapsed since the staging area 120 was last flushed.

If the predefined inactivity time period has elapsed, all of the pending files/extents are flushed 460 and sent to the memory buffer 156. If the inactivity time period has not elapsed, the staging controller 206 determines 418 if a new file is waiting to be transferred to the staging area 120.

If a new file is waiting, the staging controller 206 maintains the pending files/extents in the staging area 120 and repeats step 454 after the new file is appended to the pending files/extents. If a new file is not waiting, the staging controller 206 repeats steps 464, 466, and 468 until either (1) a dismount is requested, (2) the inactivity time period has elapsed, or (3) a new file is waiting. When one of these three events occurs, the staging controller 206 processes the event as described above.

Figure 5:
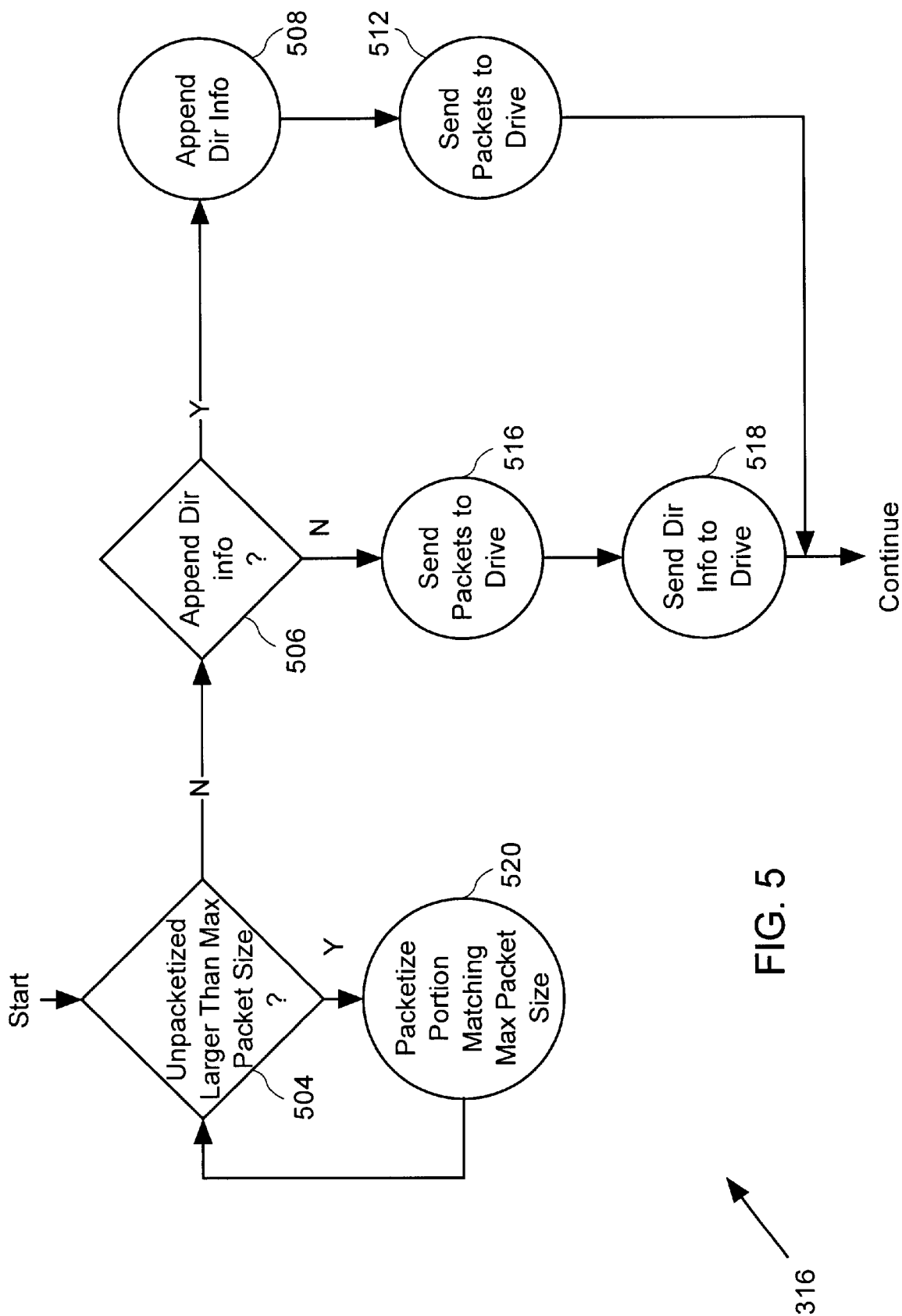
FIG. 5 is a flow diagram illustrating the method for building and sending packets according to a preferred embodiment of the present invention.

FIG. 5 is a flow diagram illustrating the method by which the packetizer 210 builds and sends packets according to a preferred embodiment of the present invention. The packetizer 210 may or may not perform but includes provisions for both data compression and/or data encryption as part of the packet building process. After the memory buffer 156 receives unpacketized files/extents (either the file directly from the determinator 204 or the files/extents flushed from the staging area 120), the packetizer 210 determines 504 if the total size of the unpacketized files/extents in the memory buffer 156 is larger than the maximum packet size.

If the packetizer 210 determines 504 that the total size of the unpacketized files/extents is not larger than the maximum packet size, the packetizer 210 determines 506 if directory information (dir info) will fit into the same packet as the unpacketized files/extents. The dir info includes information about files in the transaction such as file names, attributes, aliases for symbolic links, locations of files/extents, entries for extended attributes, data lengths, file unit sizes, and file version numbers.

If the dir info will fit into a single packet with the unpacketized files/extents, the packetizer 210 appends 508 the dir info to the unpacketized files/extents based upon the remaining storage availability in the packet, and sends 512 the packet to the drive buffer 124. If the dir info does not fit into the same packet as the unpacketized files/extents, the packetizer 210 sends 516 the packet(s) to the drive buffer 124, and sends 518 the dir info to the drive buffer 124.

Alternatively, if the packetizer 210 determines 504 that the total size of the unpacketized files/extents is larger than the maximum packet size, the packetizer 210 packetizes 520 a portion of the unpacketized files/extents that matches the maximum packet size. Subsequently, the packetizer 210 repeats the process, beginning at step 504 for the remaining unpacketized files/extents.

Figure 6:
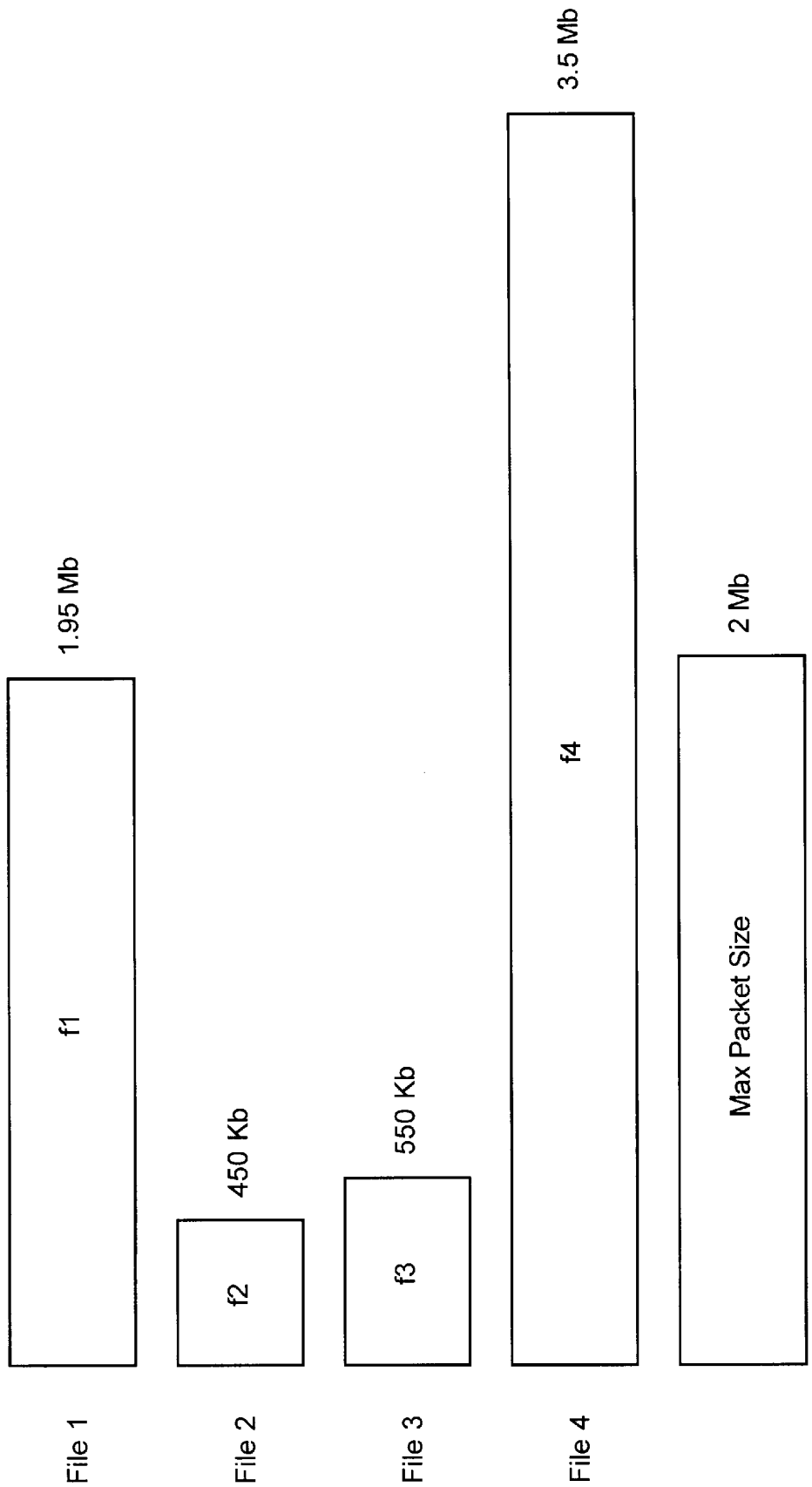
FIG. 6 is a pictorial diagram illustrating a series of four files and a drive buffer that are used in an example of the operation of a preferred embodiment of the present invention.

An example of a write operation according to a preferred embodiment of the present invention is described below with reference to FIGS. 6–14. FIG. 6 is an illustration of a series of four files and a maximum packet size to be used in the example. The first file (File1 or f1) contains 1.95 Mb of data. The second file (File2 or f2) contains 450 kilobytes (Kb) of data. The third file (File3 or f3) contains 550 Kb of data. The fourth file (File4 or f4) contains 3.5 Mb of data. For the example, we will define the maximum packet size as 2 Mb.

A user creates and saves four files while working in the application 152. After the fourth file is created and saved, the user dismounts the storage medium 126. Note that each file is written to the storage medium 126 in the storage drive 122 as if each file were being saved to a floppy disk. The details of the process by which the system performs each save is transparent to the user.

The controller 154 receives 302 the request from the application 152 to save data as File1. The information creator 202 creates 304 the file-related information for File1, such as the file size, which in this case is 1.95 Mb. File1 is transferred to the determinator 204.

The determinator 204 determines 408 that the size of File1 does not exceed the maximum packet size, and determines 410 that the size of File1 (1.95 Mb) approaches (e.g., is greater than 90% of) the maximum packet size (2 Mb). Therefore, File1 is sent directly 412 to the memory buffer 156.

After the memory buffer 156 receives 314 File1, the packetizer 210 builds Packet1. With reference to FIG. 5, the packetizer 210 determines 504 that File1 is smaller than the maximum packet size, and determines 506 that the dir info will not fit into the same packet as File1. Therefore, the packetizer 210 sends 516 Packet1 to the drive buffer 124, and sends 518 the dir info to the drive buffer 124. Thereafter, the write controller 212 controls the writing of a first transaction by the storage drive 122 onto the storage medium 126.

Figure 7:
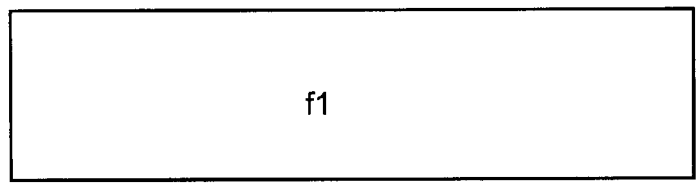
FIG. 7 is a pictorial diagram illustrating a first packet which is built in an example of the operation of a preferred embodiment of the present invention.

FIG. 7 illustrates the components of Packet1. Packet1 comprises File1.

Figure 8:
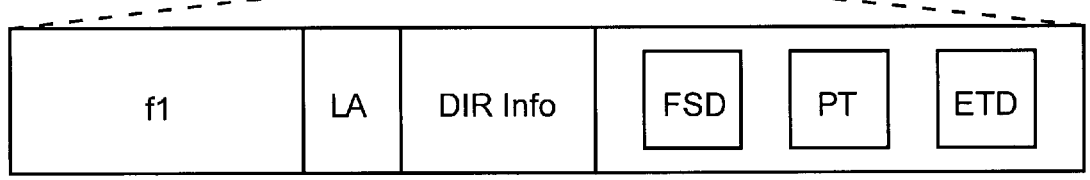
FIG. 8 is a pictorial diagram illustrating the components of a first transaction which occurs in an example of the operation of a preferred embodiment of the present invention.
Figure 9:
FIGS. 9A and 9B are pictorial diagrams illustrating a second and a third packet which are formed in an example of the operation of a preferred embodiment of the present invention.
Figure 9:
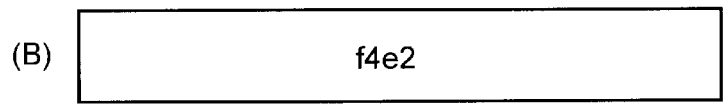

FIG. 8 illustrates a logical file structure created on the storage medium 126 as a result of the first transaction. As shown in FIG. 8, the logical file structure comprises, in sequence: File1, a link area (LA), dir info, a file system descriptor (FSD), a path table (PT), and an end transaction descriptor (ETD). The LA comprises, in sequence: a run-out, a link, and a run-in. Note that the LA is a drive dependent feature which is accommodated by the firmware of the drive and is not part of the process in packet recording. The link area is automatically appended to the end of a packet by a recorder. The ETD includes the location of the FSD for the same transaction and the location of the ETD for the immediately preceding transaction (the preceding ETD). A FSD includes the location of the PT for the same transaction. A PT allows access to the files recorded in the same transaction because the PT includes the location of the dir info associated with each file recorded in the same transaction. The ETD, FSD, and PT are described further in the specification of the ECMA 168 standard.

Regarding File2, the controller 154 receives 302 the request from the application 152 to save data as File2. The information creator 202 creates the file-related information for File2, such as the file size, which in this case is 450 Kb. File2 transferred to the determinator 204.

The determinator 204 determines 408 that the size of File2 (450 Kb) does not exceed the maximum packet size (2 Mb), and determines 410 that the size of File2 does not approach the maximum packet size. Therefore, File2 is sent 406 to the staging area 120.

File2 becomes the pending file in the staging area 120. Thereafter, the staging controller 206 (1) determines 454 that the size of File2 does not exceed the maximum packet size, (2) determines 458 that the size of File2 does not approach the maximum packet size, (3) determines 464 that a dismount has not yet been requested, (4) determines 466 that the inactivity time period has not elapsed, and (5) determines 468 that a new write request has been passed (in this case, a request to write File3). Therefore, the staging controller 206 maintains 470 File2 in the staging area 120.

Regarding File3, the controller 154 receives 302 the request from the application 152 to save File3. The information creator 202 creates the file-related information for File3, such as the file size, which in this case is 550 Kb. File3 is transferred to the determinator 204.

The determinator 204 determines 408 that File3 is not larger than the maximum packet size, and determines 410 that File3 does not approach the maximum packet size. Therefore, File3 is sent 406 to the staging area 120.

File3 is appended 308 to File2 in the staging area 120. Thereafter, the staging controller 206 in performing step 311: (1) determines 454 that the combined size of File2 and File3 does not exceed the maximum packet size, (2) determines 458 that the combined size of File2 and File3 does not approach the maximum packet size, (3) determines 464 that a dismount has not yet been requested, (4) determines 466 that the inactivity time period has not elapsed, and (5) determines 468 that a new write request has been passed (in this case, a request to write File4). Therefore, the staging controller 206 maintains 470 File2 and File3 in the staging area 120.

Regarding File4, the controller 154 receives 302 the request from the application 152 to save File4. The information creator 202 creates file-related information for File4, such as the file size, which in this case is 3.5 Mb. File4 is transferred to the determinator 204.

The determinator 204 determines 408 that File4 is larger than the maximum packet size. Therefore, File4 is sent 406 to the staging area 120.

File4 is appended 308 to File2 and File3. Thereafter, the staging controller 206 determines 454 that the combined size of File2, File3, and File4 (4.5 Mb) exceeds the maximum buffer size (2 Mb). Therefore, the staging controller 206 flushes 456 File2, File3, and a first extent of File4 (Extent1 or f4e1) which is 1 Mb in size. In this example, the group of files or files/extents flushed would comprise File2, File3 and a 1 Mb long extent of File4 (Extent1 or f4e1).

The staging controller 206 repeats step 454 and determines that the size of the remaining extent of File4 (2.5 Mb) exceeds the maximum buffer size. Therefore, the staging controller 206 flushes 456 a second extent of File4 (Extent2 or f4e2).

The staging controller 206 repeats step 454 and determines that the size of the remaining extent of File4 (500 Kb) does not exceed the maximum buffer size. Thereafter, the staging controller 206: (1) determines 458 that 500 Kb does not approach the maximum packet size, (2) determines 464 that a dismount has not yet been requested, (3) determines 466 that the inactivity time period has not yet elapsed, and (4) determines 468 that a new file is not waiting to be received. Therefore, the staging controller 206 repeats steps 464, 466, and 468 until either (1) a dismount is requested, (2) the inactivity time period has elapsed, or (3) another file is waiting. When one of these three events occurs, the staging controller 206 processes the event as described above with reference to FIG. 4B.

Meanwhile, the memory buffer 156 receives File2, File3, Extent1, and Extent2. Thereafter, the packetizer 210 determines 504 that the combined size of File2, File3, Extent1, and Extent2 (4 Mb) is larger than the maximum packet size. Therefore, the packetizer 210 packetizes 520 File2, File3, and Extent1 (whose combined size is 2 Mb). The packetizer 210: (1) repeats step 504 to determine that the size of Extent2 (2 Mb) is not smaller than the maximum packet size; (2) packetizes 520 Extent2; (3) repeats step 504 to determine that there are no unpacketized files extents in the memory buffer 156; and (4) determines 506 that the dir info will not fit into the same packet as Extent2 (since the size of Extent2 is equal to the maximum packet size). Therefore, the packetizer 210 sends 516 Packet2 and Packet3 to drive buffer 124, and sends 518 the dir info to drive buffer 124. Thereafter, the write controller 212 controls the writing of a second transaction by the storage drive 122 onto the storage medium 126.

FIGS. 9A and 9B illustrate the components of Packet2 and Packet3. As shown in FIG. 9A, Packet2 comprises, in sequence: File2, File3, and Extent1. As shown in FIG. 9B, Packet3 comprises Extent2.

Figure 10:
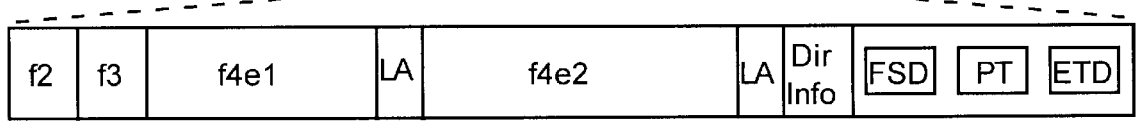
FIG. 10 is a pictorial diagram illustrating the components of a second transaction which occurs in an example of the operation of a preferred embodiment of the present invention.

FIG. 10 is an illustration of a logical file structure created on the storage medium 126 as a result of the second transaction. As shown in FIG. 10, the logical file structure comprises, in sequence: File2, File3, Extent1, a LA, Extent2, a LA, dir info, a FSD, a PT, and an ETD.

As stated above, and with reference to FIG. 4B, after the staging controller 206 determines that the total size of the pending files/extents does not exceed or approach the maximum packet size, the staging controller 206 repeats steps 464, 466, and 468. In this example, the user requests after the second transaction that the storage medium 126 be dismounted. As a result, the staging controller 206 determines 464 that a request has been received to dismount the storage medium 126. Therefore, the staging controller 206 flushes 460 all of the pending files/extents in the staging area 120. In this example, a third extent of File4 (Extent3 or f4e3) is flushed from staging area 120.

The memory buffer 156 receives the Extent3. Thereafter, the packetizer 210 determines 504 that the size of Extent3 is smaller than the maximum packet size, and determines 506 that the dir info will fit into the same packet as Extent3. Therefore, the packetizer 210 appends 508 the dir info to Extent3, and sends 512 Packet4 to the drive buffer 124. Thereafter, the write controller 212 controls the writing of a third transaction by the storage drive 122 onto the storage medium 126.

FIG. 11 illustrates Packet4. As shown in FIG. 11, Packet4 comprises Extent3 and dir info.

FIG. 12 illustrates a logical file structure as written on the storage medium 126 as a result of the second transaction. As shown in FIG. 12, the logical file structure comprises, in sequence: Extent3, dir info, a FSD, a PT, an ETD, and a LA.

Figure 13:
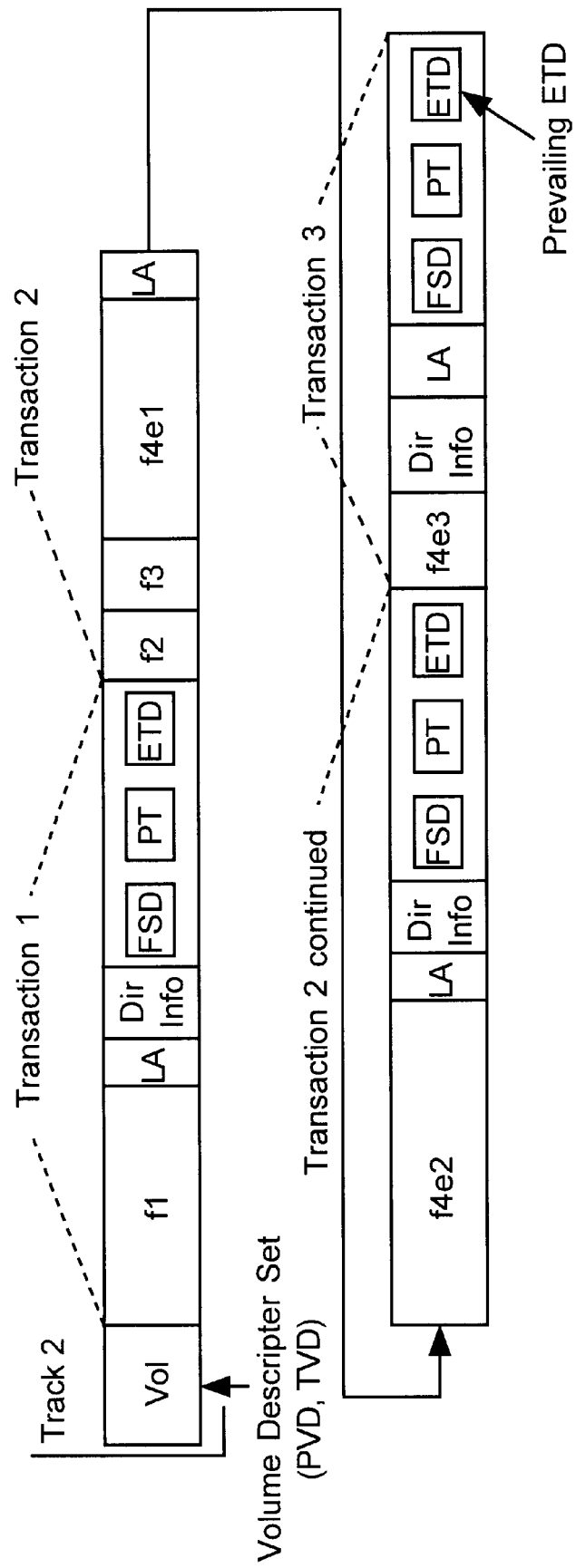
FIG. 13 is a pictorial diagram illustrating a logical layout of a file system as written on a storage medium after three transactions in a supplementary example describing the operation of a preferred embodiment of the present invention.

FIG. 13 illustrates the logical layout of the file system as written in the storage medium 126 after the three transactions described above. A feature of the invention is that the data is stored on the CD-R begins on the second track (track 2). At least one track, e.g., the first track (track 1), is reserved for compatibility purposes as described herein with reference to FIG. 14.

The beginning of track 2 contains a volume descriptor set including a primary volume descriptor (PVD). The volume descriptor set identifies the beginning of a volume (session) and particular attributes of the volume. Preferably, the volume descriptor set will follow the ECMA 168 standard.

Next, the first transaction is recorded. As discussed above and as shown in FIG. 8, the first transaction comprises, in sequence: File1, a LA, dir info, a FSD, a PT, and an ETD.

Next, the second transaction is recorded. As discussed above and shown in FIG. 10, the second transaction comprises, in sequence: File2, File3, Extent1, a LA, Extent2, a LA, dir info; a FSD, a PT, and an ETD.

Next, the third transaction is recorded. As discussed above and shown in FIG. 12, the third transaction comprises, in sequence: Extent3, dir info, a LA, a FSD, a PT, and an ETD.

Figure 14:
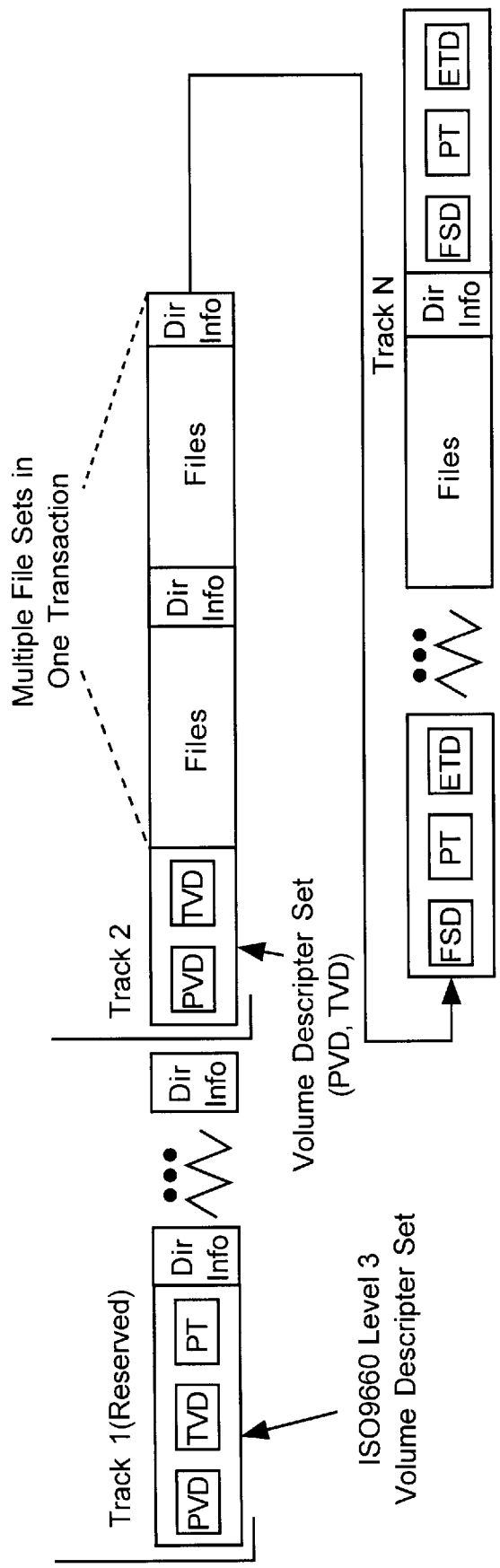
FIG. 14 is a pictorial diagram illustrating a logical layout of a file system as written on a storage medium after the storage medium is fixated according to a preferred embodiment of the present invention.

FIG. 14 illustrates the logical layout of the file system on the storage medium 126 after the storage medium 126 is closed (i.e. fixated) according to a preferred embodiment of the present invention. Note that since a transaction can contain multiple file sets, a transaction with multiple file sets is illustrated in FIG. 14. Each file set includes files/extents and dir info.

Track 1 is reserved when the storage medium 126 is open (i.e., not fixated). However, when the storage medium 126 is closed, track 1 is recorded with information that makes the file system on the storage medium 126 readable by systems capable of reading a general file system for CD-ROM encoding, such as the ISO 9660 level 3 file system. Preferably, track 1 comprises a volume descriptor set which includes a primary volume descriptor (PVD) and a terminating volume descriptor (TVD), a path table (PT), and the dir info for all the files recorded on storage medium 126. The PVD, TVD, PT, and dir info are described further in the specification of the ISO 9660 standard.

Closing a session on storage medium 126 does not change the contents of track 2 through track N (e.g., N=99). The recording of tracks 2 through N occurred while the storage medium 126 was open and is described above with reference to FIGS. 1 through 13. Additional sessions can be added to a closed CD-R disc as both a multi-session and/or a multi-volume approach to encoding subsequent data once a previous session is closed. These alternative embodiments are encompassed in the scope of the present invention.

What is claimed is:

1. In a computer-based system having a processor, a memory module, a controller in the memory module, a memory buffer in the memory module, a storage device, a staging area in the storage device, a storage drive, a storage medium communicating with the storage drive, and a bus supporting data transfer between said memory module, said storage device and said storage drive, a method for responding to a request to write data to the storage medium, comprising:

receiving the data into the memory module;

sending the received data directly to the memory buffer when the received data does not exceed a maximum packet size and does approach the maximum packet size;

appending the received data from the memory module across said bus to pending data in the staging area when the received data is not directly sent to the memory buffer;

selecting unpacketized data from the pending data in the staging area;

transferring the unpacketized data from the staging area to the memory buffer across said bus to define memory buffer data in the memory buffer; and packetizing the unpacketized data of the memory buffer data into a packet that is temporarily held in said memory buffer, and said packet is not larger than the maximum packet size.

2. The method of claim 1, wherein the step of selecting unpacketized data from the pending data occurs if one of the following events occurs:

the size of the pending data approaches or exceeds the maximum packet size;

a request to dismount the storage medium is received; and an inactivity time period is elapsed.

3. The method of claim 2, wherein the steps of appending the received data to pending data in the staging area, selecting unpacketized data from the pending data, and transferring the unpacketized data to the memory buffer, occur if one of the following events occurs:

the size of the received data is greater than the maximum packet size; and the size of the received data does not approach and does not exceed the maximum packet size.

4. The method of claim 2, wherein the step of packetizing the unpacketized data into the packet with a maximum packet size includes the steps of:

(a) determining if the size of the unpacketized data is larger than the maximum packet size;

(b) packetizing a portion of the unpacketized data equal in size to the maximum packet size, if the size of the unpacketized data is larger than the maximum packet size;

(c) repeating steps (a) and (b) for the remaining unpacketized data, until the remaining unpacketized data is not larger than the maximum packet size;

(d) determining if the size of the last packetized data plus the size of a file system information is less than the maximum packet size; and (e) appending the file system information to the last packetized data to create a file, if the size of the last packetized information plus the size of a file system information is less than the maximum packet size.

5. The method of claim 4, wherein the steps of appending the received data to pending data in the staging area, selecting unpacketized data from the pending data, and transferring the unpacketized data to the memory buffer, occur if one of the following events occurs:

the size of the received data is greater than the maximum packet size; and the size of the received data does not approach and does not exceed the maximum packet size.

6. The method of claim 2, wherein the maximum packet size is related to the size of a drive buffer in the storage drive.

7. The method of claim 2, wherein the storage medium is a recordable compact disc.

8. The method of claim 2, further comprising the step of:

sending the packet to a drive buffer in the storage drive across said bus from said memory buffer.

9. A computer based system for storing data on a storage medium, the system comprising:

a first buffer;

a second buffer; and a controller, coupled to said first buffer and said second buffer, for controlling the storage of data, the controller including:

a determinator, coupled to said first buffer, for ascertaining whether to store data in said first buffer;

a first buffer controller, coupled to said first buffer, for controlling the transfer of data from said first buffer to said second buffer and the transfer of data occurs when the size of the data in said first buffer exceeds the maximum packet size or the size of the data in said first buffer approaches and does not exceed the maximum packet size; and a packetizer, coupled to said second buffer, for packetizing said data according to the maximum packet size.

10. The system of claim 9, wherein said controller further comprises:

a write controller, coupled to said packetizer, for writing said packetized data to said storage medium.

11. The system of claim 9, wherein said first buffer controller transfers data to said second buffer when one of the size of the data in said first buffer approaches said maximum packet size, a request to dismount the storage medium occurs, and an inactivity period has elapsed.

12. In a computer-based system having a processor, a memory module, a controller in the memory module, a memory buffer in the memory module, a storage device, a staging area in the storage device, a storage drive, a storage medium communicating with the storage drive, and a bus supporting data transfer between said memory module, said storage device and said storage drive, a method for responding to a request to write data to the storage medium, comprising:

receiving the data into the memory module;

sending the received data directly to the memory buffer when the received data approaches a maximum packet size;

appending the received data from the memory module across said bus to pending data in the staging area when the received data is not directly sent to the memory buffer;

selecting unpacketized data from the pending data in the staging area;

transferring the unpacketized data from the staging area to the memory buffer across said bus to define memory buffer data in the memory buffer; and packetizing the unpacketized data of the memory buffer data into a packet that is temporarily held in said memory buffer, and said packet is not larger than the maximum packet size;

wherein the appending the received data to pending data in the staging area, selecting unpacketized data from the pending data, and transferring the unpacketized data to the memory buffer, occur if the size of the received data is greater than the maximum packet size or the size of the received data does not approach and does not exceed the maximum packet size.

13. In a computer-based system having a processor, a memory module, a controller in the memory module, a memory buffer in the memory module, a storage device, a staging area in the storage device, a storage drive, a storage medium communicating with the storage drive, and a bus supporting data transfer between said memory module, said storage device and said storage drive, a method for responding to a request to write data to the storage medium, comprising:

receiving the data into the memory module;

sending the received data directly to the memory buffer when the received data does not exceed a maximum packet size and does approach the maximum packet size;

appending the received data from the memory module across said bus to pending data in the staging area when the received data is not directly sent to the memory buffer;

selecting unpacketized data from the pending data in the staging area;

transferring the unpacketized data from the staging area to the memory buffer across said bus to define memory buffer data in the memory buffer; and packetizing the unpacketized data of the memory buffer data into a packet that is temporarily held in said memory buffer, and said packet is not larger than the maximum packet size;

wherein the selecting of unpacketized data from the pending data occurs if the size of the pending data approaches or exceeds the maximum packet size, a request to dismount the storage medium is received, or an inactivity time period is elapsed.

14. The method of claim 13, wherein the packetizing of the unpacketized data into the packet with a maximum packet size includes:
   (a) determining if the size of the unpacketized data is larger than the maximum packet size;
   (b) packetizing a portion of the unpacketized data equal in size to the maximum packet size, if the size of the unpacketized data is larger than the maximum packet size;
   (c) repeating steps (a) and (b) for the remaining unpacketized data, until the remaining unpacketized data is not larger than the maximum packet size;
   (d) determining if the size of the last packetized data plus the size of a file system information is less than the maximum packet size; and
   (e) appending the file system information to the last packetized data to create a file, if the size of the last packetized information plus the size of a file system information is less than the maximum packet size.

15. The method of claim 14, wherein the appending of the received data to pending data in the staging area, selecting unpacketized data from the pending data, and transferring the unpacketized data to the memory buffer, occur if one of the following events occurs:
   the size of the received data is greater than the maximum packet size; and
   the size of the received data does not approach and does not exceed the maximum packet size.

16. A computer based system for storing data on a storage medium, the system comprising:
   a first buffer;
   a second buffer; and
   a controller, coupled to said first buffer and said second buffer, for controlling the storage of data, the controller including:
      a determinator, coupled to said first buffer, for ascertaining whether to store data in said first buffer based on the size of the data relative to a maximum packet size;
      a first buffer controller, coupled to said first buffer, for controlling the transfer of data from said first buffer to said second buffer;
      a packetizer, coupled to said second buffer, for packetizing said data according to the maximum packet size; and
      a write controller, coupled to said packetizer, for writing said packetized data to said storage medium.

17. The system of claim 16, wherein said first buffer controller transfers data to said second buffer when one of the following occurs: the size of the data in said first buffer approaches said maximum packet size, a request to dismount the storage medium occurs, and an inactivity period has elapsed.

18. A computer based system for storing data on a storage medium, the system comprising:
   a first buffer;
   a second buffer; and
   a controller, coupled to said first buffer and said second buffer, for controlling the storage of data, the controller including:
      a determinator, coupled to said first buffer, for ascertaining whether to store data in said first buffer, sending the data directly to the second buffer when the data does not exceed a maximum packet size and does approach the maximum packet size;
      a first buffer controller, coupled to said first buffer, for controlling the transfer of data from said first buffer to said second buffer, when the data was not directly sent to the second buffer; and
      a packetizer, coupled to said second buffer, for packetizing said data according to the maximum packet size;
   wherein said first buffer controller transfers data to said second buffer when one of the following occurs, the size of the data in said first buffer approaches or exceeds said maximum packet size, a request to dismount the storage medium occurs, and an inactivity period has elapsed.

19. The system of claim 18, wherein said controller further comprises:
   a write controller, coupled to said packetizer, for writing said packetized data to said storage medium.

* * * * *